Oct. 16, 1928.
J. R. SAYLOR
TAP
Filed April 22, 1922
1,688,209
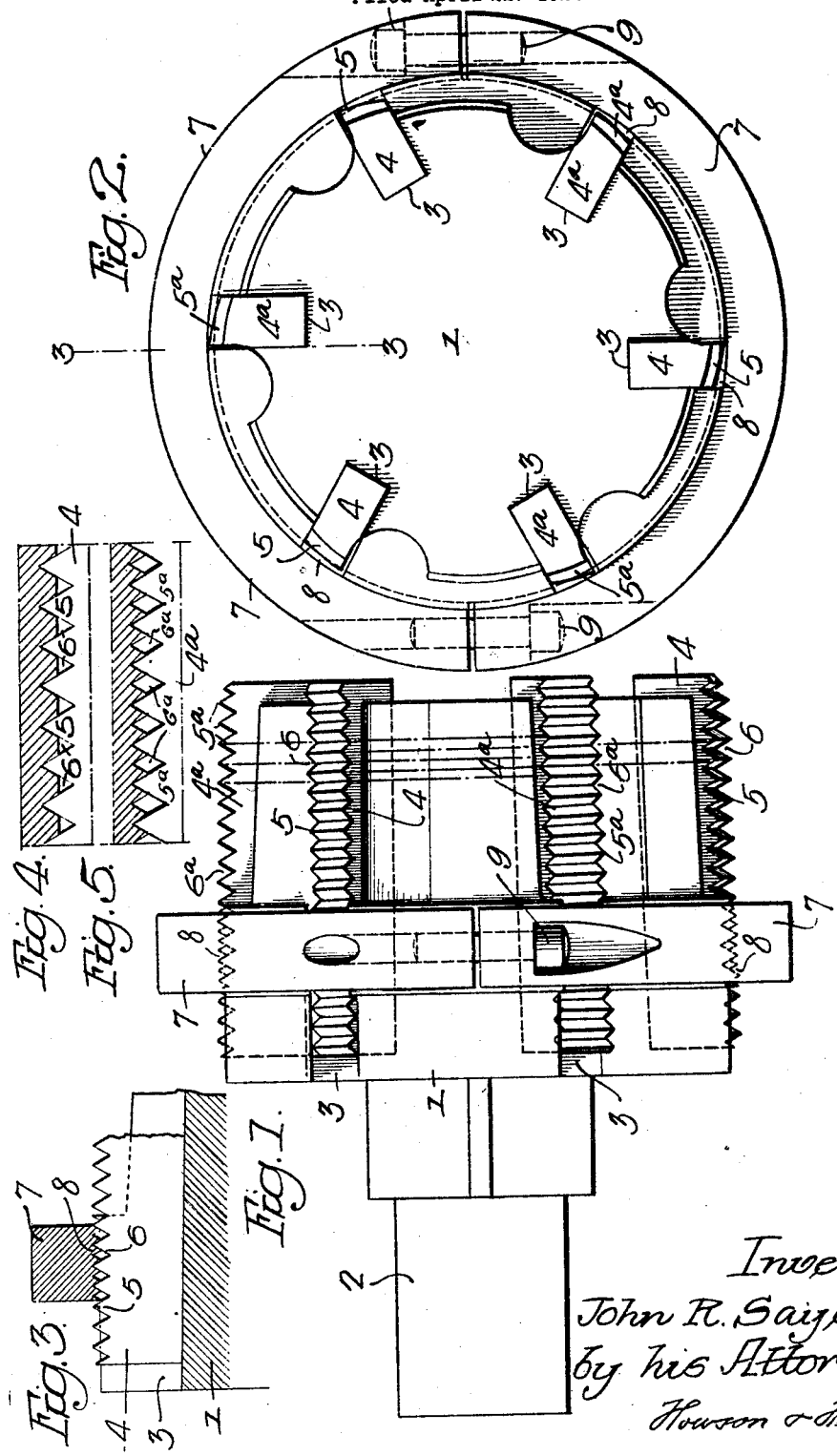
Inventor:-
John R. Saylor.
by his Attorneys-
Howson & Howson Patented Oct. 16, 1928.

1,688,209

UNITED STATES PATENT OFFICE.

JOHN R. SAYLOR, OF POTTSTOWN, PENNSYLVANIA; ELIZABETH E. SAYLOR, EXECUTRIX OF JOHN R. SAYLOR, DECEASED, ASSIGNOR TO POTTSTOWN MACHINE COMPANY, OF POTTSTOWN, PENNSYLVANIA, A CORPORATION OF PENNSYLVANIA.

TAP.

Application filed April 22, 1922. Serial No. 556,102.

This invention relates to certain improvements in taps for cutting screw threads in cast steel objects, particularly in cast steel fittings.

One object of the invention is to construct a tap so that the metal cut from the fitting, or other device, will readily free itself and will prevent the breaking up of the chips by the frictional action between the tap and the fitting.

A further object of the invention is to construct the tap so that one set of bits will cut alternate threads and the other set of bits will cut threads in the alternate spaces left by the first mentioned set of bits.

In the accompanying drawings:

Fig. 1 is a side view of my improved tap;
Fig. 2 is an end view;
Fig. 3 is a sectional view taken on the line 3—3, Fig. 2; and
Figs. 4 and 5 are diagrammatic views showing the method of cutting the threads.

Referring to the drawings, 1 is the body of the tap having a spindle 2 adapted to an opening in the chuck of a tapping machine. In the body of the tap is a series of longitudinal grooves 3, in which are the bits 4 and 4ª, respectively. These bits have deep threads cut in them. The V-shape teeth 5, in the present instance, are twice the depth of the thread to be cut, leaving a channel, or gullet 6 between each tooth, which is of V-shape. as shown in Fig. 4. The V-shape teeth of the bits 4ª alternate with the teeth of the bits 4 and cut the blank space left by the bits 4, as illustrated in Fig. 5. This construction of the bits makes the teeth more substantial and the work is distributed over a greater number of bits. Broadly, this method is not new. Heretofore, the depth of cut was equal to the height of the teeth of the bits, consequently, there was no space left for the chips to escape. They were ground between the teeth of the bits and the work, increasing the friction and injuring, to a certain extent, both the bits and the work, so that the cut was not a clean, smooth cut.

By my invention, the teeth are continued below the cutting point in order to form gullets 6 between the base of the teeth 5 of the bits 4, Fig. 4, and gullets 6ª between the base of the teeth 5ª of the bits 4ª, Fig. 5. This allows sufficient space between the teeth and beyond the face of the fitting, or other article, being cut, to permit chips to pass immediately into the gullets, consequently, they are not ground by the action of the bits and the work, relieving the parts of considerable friction. The bits are not injured and the faces of the finished threads are left in a smooth condition. The edges of the teeth are left in a perfect condition.

The bits are held to the body of the tap by a two-part gauge ring 7 having a thread 8, similar to the thread cut by the bits, and which engages the teeth of the bits, as shown in Fig. 3. As will be apparent, the gauge ring 7 also determines the depth of cut. The two parts of the ring are clamped to the tap by bolts 9, which pass through plain openings in one part of the ring and into threaded openings in the other part of the ring, as shown in Fig. 1. Other means of securing the bits to the body portion may be used without departing from the essential features of the invention.

I claim:

1. The combination in a tap, of a body portion; a series of bits secured to the body portion; alternate bits arranged to cut one set of threads, the other bits being arranged to cut threads in the spaces between the threads cut by the first mentioned bits, the teeth of each bit being of V-shape at the base thereof and also of a greater depth than the theoretical full thread being cut so as to leave gullets at the base of the teeth for the free escape of the chips produced in cutting.

2. A bit for a tap having a series of V-shape teeth spaced apart twice the distance of the finished thread so that the teeth will cut alternate threads, the teeth extending to a greater depth than the theoretical full thread to be cut, whereby a gullet of V-shape may be formed for the free escape of the chips produced in cutting.

JOHN R. SAYLOR.